United States Patent [19]

Morikawa et al.

[11] 3,993,731

[45] Nov. 23, 1976

[54] SELECTIVE REMOVAL OF NITROGEN OXIDES FROM WASTE GAS

[75] Inventors: Kiyoshi Morikawa, Fujisawa; Fusao Nishida, Tokyo; Tomiaki Yamada, Yokohama; Noriyuki Suzuki, Tokyo; Takehiko Takeda, Yokohama; Tsutomu Yanagihara, Tokyo; Katshiko Adachi, Yokohama; Tadashi Asanabe, Tokyo; Katuaki Ohsato, Yokohama; Kintaro Tsuda, Tokyo, all of Japan

[73] Assignee: Japan Gasoline Co., Ltd., Tokyo, Japan

[22] Filed: June 9, 1975

[21] Appl. No.: 584,913

[30] Foreign Application Priority Data

June 10, 1974 Japan................................ 49-65066

[52] U.S. Cl. .............................................. 423/239
[51] Int. Cl.² ........................................... B01D 53/34
[58] Field of Search.............. 423/239, 213.2, 213.5; 252/457, 459, 455

[56] References Cited

UNITED STATES PATENTS

| | | | |
|---|---|---|---|
| 3,860,690 | 1/1975 | Gidaspow | 423/351 X |
| 3,864,451 | 2/1975 | Lee et al. | 423/239 |
| 3,914,390 | 10/1975 | Kudo et al. | 423/239 X |

FOREIGN PATENTS OR APPLICATIONS 804,316   2/1974   Belgium ............................ 423/239

Primary Examiner—G. O. Peters
Attorney, Agent, or Firm—Cooper, Dunham, Clark, Griffin & Moran

[57] ABSTRACT

A process for the removal of nitrogen oxides from a waste gas containing said oxides in conjunction with sulfur oxides which comprises contacting said waste gas with ammonia as a reducing agent at temperatures of from 250° to 550° C in the presence of a catalyst wherein an active component containing iron or copper as the active metal and a sulfate of aluminum are supported on a silica carrier.

11 Claims, 3 Drawing Figures

SELECTIVE REMOVAL OF NITROGEN OXIDES FROM WASTE GAS

BACKGROUND OF THE INVENTION a. Field of the Invention

The present invention relates to a process for the removal of nitrogen oxides (hereinafter referred to as $NO_x$) from industrial waste gases such as from boilers, heating furnaces and incinerators which contain said oxides in conjunction with sulfur oxides (hereinafter referred to as $SO_x$) by catalytic reduction of the nitrogen oxides utilizing ammonia as the reducing agent. The invention provides a novel process for effectively removing $NO_x$ from the waste gas on a commercial scale utilizing a catalyst which manifests high initial activity even in the presence of $SO_x$, and retains this activity for a long period of time.

b. Description of the Prior Art

In recent years, the removal of $NO_x$ as well as that of $SO_x$ has become an important task in view of the mounting public issue of air pollution. No completely effective commercial method has yet been developed.

Various processes have been proposed. Of these processes, the most promising from the practical point of view is the process which effects selective catalytic reduction by use of ammonia as the reducing agent. This method uses metals of the platinum family and their oxides as catalysts.

In the reaction system in which $SO_x$ is present, however, such catalysts rapidly lose activity because of the poisonous effect of $SO_x$ so that continuous, extended operations cannot be performed. This problem manifests itself with systems containing 1000 to 2000 ppm of $SO_x$.

SUMMARY OF THE INVENTION

The process for the removal of nitrogen oxides from the waste gas according to the present invention is characterized by the fact that the nitrogen oxides are removed from a given waste gas which also contains sulfur oxides by selective catalytic reduction with ammonia at temperatures from 250° to 550° C in the presence of a catalyst which has as the carrier an active component containing iron or copper as the active metal and a sulfate of aluminum is supported on silica.

DETAILED DESCRIPTION OF THE INVENTION

Figure 1:
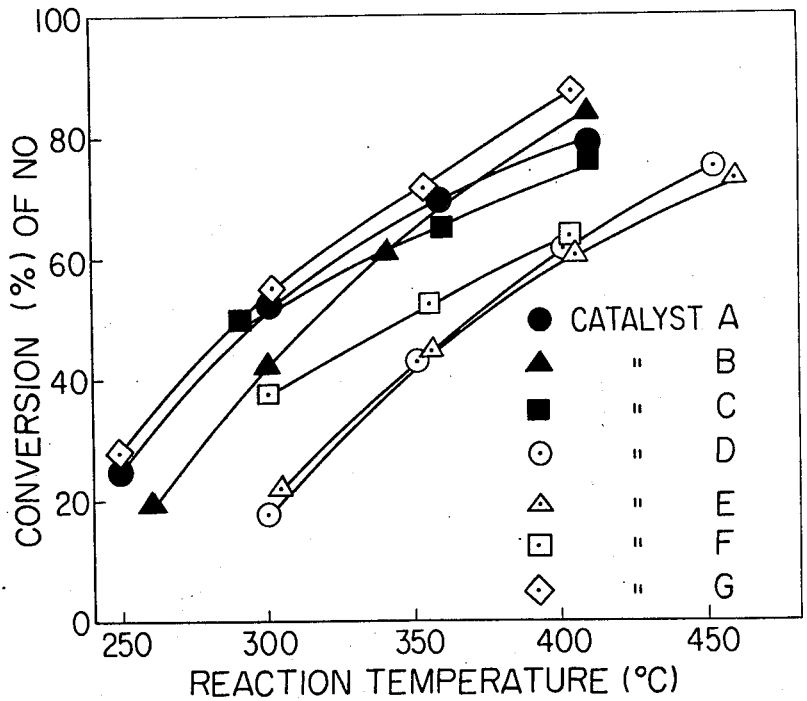
FIG. 1 is a graph showing the ratios on NO conversion obtained with the various catalysts indicated in Example 1 and Comparative Example 1, with A, B and C denoting the data of the catalysts according to the present invention and D, E, F and G denoting those of the catalysts of the comparative example.

It has been found, in accordance with the invention, that a catalyst having supported on a carrier an active component containing iron or copper, particularly in the form of sulfate, as the active metal exhibits high activity and high selectivity in the catalytic reduction of $NO_x$ with ammonia in a relatively high temperature zone of from 250° to 550° C, is highly resistant to the poisonous effect of $SO_x$.

Earlier filed Japanese Patent Application No. 545510 describes an effective process for the denitrification of waste gas by use of a catalyst in which the sulfate of iron is supported on a carrier. It has been observed that, after a long period of operation in the presence of $SO_x$, the activity of the catalyst decreases.

In contrast, when silica is used as the carrier, the substance exhibits high stability to $SO_x$, but the activity is somewhat lower than catalysts using $\gamma$-alumina as a carrier.

The catalysts of the present invention are characterized by high and prolonged activity.

For the present invention, the incorporation of aluminum sulfate is essential. The effect of the addition of this compound is demonstrated specifically in Example 1.

The active component for use in the catalyst of the present invention is preferably a sulfate of iron or copper, although it may be an oxide or iron or copper. The catalyst according to the present invention may otherwise be a composite catalyst containing both iron and copper.

For use as the carrier in the present invention, silica preferably will have not less than 50 m²/g of specific surface area, from 0.2 to 1.5 cc/g of pore volume, a large pore diameter (so that the pores measuring not less than 150 A in diameter will make up 30% or over of the total pore volume) and high resistance to attritional disintegration.

The activity of the catalyst increases with increasing concentration of active component. In the actual preparation of catalyst, however, special manufacturing techniques are necessary if the concentration of the active component is desired to exceed a certain level. Suitably, the amount of metal supported on the carrier is from 0.5 to 20% by weight, preferably from 1 to 10% by weight, based on the weight of the carrier.

The amount of aluminum sulfate utilized in conjunction with the active component is from 0.1 to 5% by weight, preferably from 0.5 to 3% by weight, based on the weight of the carrier.

Normally, the ratio of aluminum sulfate to active component is from 0.05 to 0.5 in terms of metal weight ratio.

Conventional methods may be employed to prepare the catalyst. For example, silica molded in the form of spheres or pellets may be impregnated with an aqueous mixed solution of an active metal salt such as metal sulfate, metal nitrate, etc. and aluminum sulfate, the impregnated silica particles dried at 100° to 150° C and subsequently calcined at 300° to 600° C. Alternatively, a mixture of silica powder, metal salt and aluminum sulfate may be kneaded in the presence of added water, the kneaded mixture extruded or tablet molded and thereafter calcined at 300° to 600° C.

In the practice of the present invention, the reaction temperature is from 250° to 550° C. The reactivity of the catalyst is too low to obtain the desired effects when the reaction temperature is appreciably below 250° C. A higher reaction temperature than the upper limit of said range is undesirable, because the active component, particularly the metal sulfate becomes unstable so that reduction of $NO_x$ is not complete and NO forms in consequence of the reaction of oxygen and ammonia coexisting in the system.

The selection of the reaction temperature is closely related to the gas hourly spaced velocity (GHSV) which is the quotient obtained by dividing the velocity of the introduction of the gas for treatment by the catalyst volume. For the purpose of the present invention, there is generally adopted a reaction temperature which gives GHSV in the range of from 1000 to 50000 $HR^{-1}$.

If the amount of ammonia used for reduction is too low compared to the amount of $NO_x$ present in the waste gas, the quantity of nitrogen formed will be low. When the amount is excessive, the costs of treatment are too high, especially since a secondary treatment is required to remove residual ammonia from the treated gas. All considered, the molar ratio of $NH_3/NO$ is desired to fall in the range of from 0.8 to 1.5, preferably from 1.0 to 1.2.

Any ordinary packed-bed type reactor may be used in this invention. The so-called honey-comb type reactor or any of a variety of other types of reactors designed to minimize loss of pressure can also be employed.

There are a number of advantages to the practice of this invention.

Because of the high selectivity, the catalyst proves economical in the sense that there is little or no waste of reducing agent due to the reaction of oxygen coexisting in the gas being treated. Additionally, the range of operating temperature at which efficient denitrification occurs is so wide that the reaction system requires no rigid temperature control, and provides stable operation.

Since the catalyst is resistant to $SO_x$, the denitrification process of this invention can be incorporated in the whole waste gas treatment system either before or after the desulfurization process.

DESCRIPTION OF THE PREFERRED EMBODIMENTS

EXAMPLE 1

A mixture prepared by mixing 14.9 g of $FeSO_4 \cdot 7H_2O$ above from Solution A will be referred to as Catalyst A, and from Solution B as Catalyst B, and that from Solution C as Catalyst C respectively. The amounts of metals supported on these catalysts based on the weights of carrier were as follows:

| Catalyst A | Fe 6% by weight | Al 1% by weight | |
|---|---|---|---|
| Catalyst B | Cu 6% by weight | Al 1% by weight | |
| Catalyst C | Fe 3% by weight | Cu 3% by weight | Al 1% by weight |

The catalysts thus obtained were tested for activity by means of a normal-pressure packed-bed type reactor. The reaction tube measured 20 mm in diameter and 500 mm in overall length, and the reaction tube interior consisted of a preheating zone and a catalyst zone which were maintained at desired temperatures by means of electric heaters. The reaction tube was packed with 10 cc of the catalyst to be tested.

A simulated gas consisting of 500 ppm of NO, 550 ppm of $NH_3$, 1500 ppm of $SO_2$, 3% of $O_2$, 10% of $H_2O$ and the balance to make up 100% of $N_2$ was introduced into the reactor at a rate of 300 Nl/hr. The gas discharged at varying temperatures from the reactor outlet was analyzed for NO concentration to calculate NO conversion. The results were as shown in FIG. 1.

In the experiments, the gas hourly space velocity (GHSV) was fixed at 30000 $HR^{-1}$.

Comparative Example 1

Catalysts D, E and F were prepared containing iron sulfate, copper sulfate, or iron sulfate plus copper sulfate by the same impregnating method on the same silica carrier as used in Example 1. Catalyst G was prepared by using γ-alumina (in the form of particles measuring 1.5 mm in diameter and 3 to 5 mm in length) as the carrier and having iron sulfate supported thereon by the same procedure as used in Example 1.

In the catalysts thus prepared, the amounts of the metals supported on the carriers were measured to be as follows:

| Catalyst D | Silica as carrier | Fe 6% by weight | |
|---|---|---|---|
| Catalyst E | Silica as carrier | Cu 6% by weight | |
| Catalyst F | Silica as carrier | Fe 3% by weight | Cu 3% by weight |
| Catalyst G | γ-Alumina as carrier | Fe 6% by weight | | and 6.6 g of $Al_2(SO_4)_3 \cdot 18H_2O$ was dissolved in water to give 50 ml of an aqueous mixed solution of iron sulfate and aluminum sulfate (Solution A). In the same manner, Solution B was prepared by dissolving 12.6 g of $CuSO_4 \cdot 5H_2O$ and 6.6 g of $Al_2(SO_4)_3 \cdot 18H_2O$ in water and Solution C by dissolving 7.5 g of $FeSO_4 \cdot 7H_2O$, 6.3 g of $CuSO_4 \cdot 5H_2O$ and 6.6 g of $Al_2(SO_4)_3 \cdot 18H_2O$ in water.

In beakers, 10 g each of $SiO_2$ (in the form of particles each measuring 1.0 mm in diameter and 2 to 5 mm in length) having 0.62 g/cc of bulk density, 359 m²/g of specific surface area and 0.94 cc/g of pore volume were placed. The aforementioned aqueous solutions (9.9 ml) were introduced dropwise to the separate beakers so that $SiO_2$ could absorb the solution uniformly. The carriers thus impregnated with different aqueous mixed sulfates solutions were immediately dried at 100° C for 3 hours and thereafter calcined at 550° C for 3 hours in a current of air. The catalyst prepared as described These catalysts were tested for activity under the same conditions as in Example 1. The results are indicated in FIG. 1 in conjunction with those of Example 1.

As in plain from FIG. 1, both Catalyst D and Catalyst E having only iron sulfate or only copper sulfate supported on silica showed low degrees of activity.

Comparison of the results reveals that where a metal sulfate alone was supported on silica as the carrier or where a complex sulfate of iron and copper alone was used as in the case of Catalyst F, no satisfactory activity was observed, but that Catalysts A, B and C containing metal sulfates together with aluminum sulfate exhibited good activity.

Catalyst G which used γ-alumina as its carrier showed satisfactory initial activity. As shown in a subsequent comparative example to be cited afterward, however, this catalyst was gradually affected by the poisonous effect of $SO_x$ present in the waste gas and was degraded in activity as the operation continued.

Thus, this catalyst is of little value in waste gas systems containing $SO_x$.

EXAMPLE 2

Catalysts were prepared using silica as the carrier and having iron sulfate and aluminum sulfate, the former in a fixed amount and the latter in a varying amount, supported as the active metals on said carrier. They were tested for activity to determine the effect of the content of aluminum sulfate on the catalyst reactivity. In this case, the amount of iron was fixed at 6% by weight based on the weight of carrier and the respective amounts of aluminum sulfate were 0, 0.5, 1.0 and 1.5% by weight measured as aluminum based on the weight of carrier.

Figure 2:
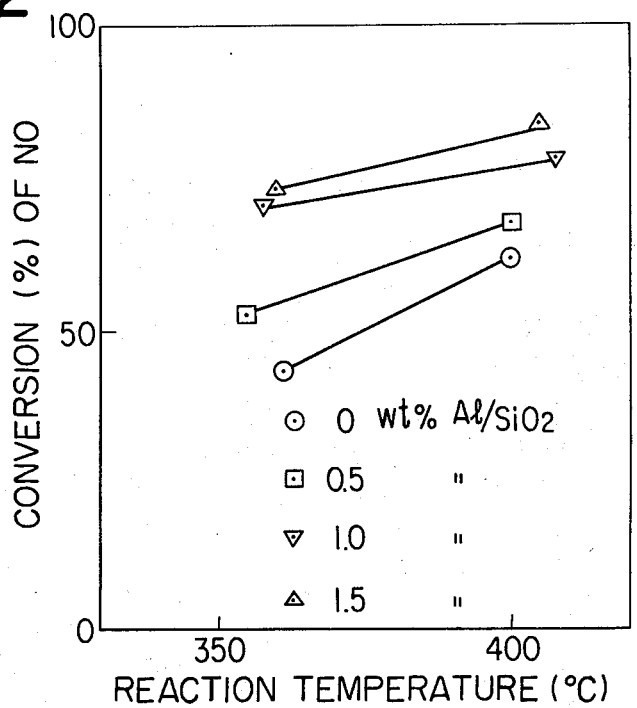
FIG. 2 is a graph showing the effects of aluminum sulfate addition according to Example 2.

The reactions were carried out under the same conditions as in Example 1. The results were as shown in FIG. 2.

It is evident from the graph that addition of 0.5% by weight of aluminum sulfate remarkably improves the activity of the catalyst.

EXAMPLE 3

Figure 3:
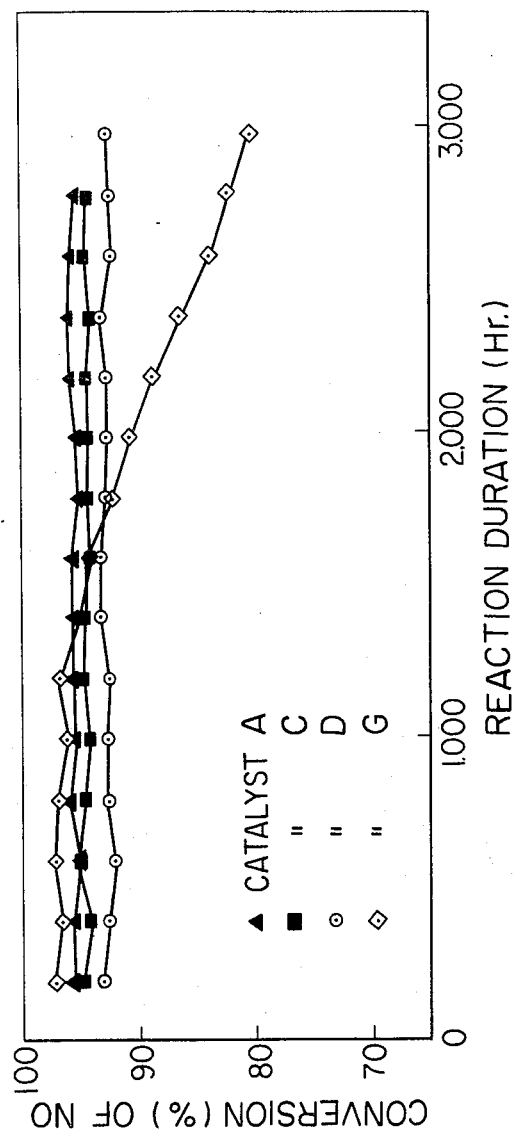
FIG. 3 is a graph showing the results of a prolonged continuous operation according to Example 3 and Comparative Example 2, and A and C denoting the data obtained according to the present invention and D and G those according to the comparative example.

Catalysts A and C prepared in Example 1 were subjected to a prolonged performance test using a simulated gas using the same reaction system as in Example 1. The reaction tube was packed with 10 cc each of the catalyst and the simulated gas consisting of 500 ppm of NO, 550 ppm of $NH_3$, 3% of $O_2$, 1500 ppm of $SO_2$, 10% of $H_2O$, balance $N_2$ was introduced at the rate of 120 Nl/hr at 380° C. The results were as shown in FIG. 3.

Comparative Example 2

Catalyst D and Catalyst G were subjected to a prolonged performance test under the same conditions as in Example 3. The results are shown in FIG. 3 in conjunction with those of Example 3. The results indicate that Catalyst G using γ-alumina as a carrier showed excellent activity in the initial stage of operation, but suffered a gradual decline of activity after about 1200 hours of operation. In the case of Catalyst D having a metal sulfate alone supported on silica, it was found that the activity itself although inferior, remained stable. In contrast, Catalyst A and Catalyst C showed activity as high as that obtained with a catalyst using γ-alumina, and retained the high activity through a continuous operation of as long as 3000 hours.

These studies establish that the catalysts of the present invention are suited to a commercial operation.

In the foregoing examples, all of the catalysts contained a sulfate of iron or copper or a complex sulfate of iron plus copper as the active component. When an oxide of the same metal was used as the active component, the catalyst activity was by far supperior to that obtainable with catalysts using γ-alumina as its carrier.

What is claimed is:

1. A process for the removal of nitrogen oxides from a waste gas containing said nitrogen oxides in conjunction with sulfur oxides, which process is characterized by contacting said waste gas with ammonia as the reducing agent at a temperature from 250° to 550° C in the presence of a catalyst having supported on silica an active component containing iron or copper as the active metal and an aluminum sulfate, for thereby causing selective catalytic reduction of said nitrogen oxides the specific surface area of the carrier being not less than 50 m²/g and the pore volume being from 0.2 to 1.5 cc/g.

2. The process according to claim 1, wherein the active component containing iron or copper is selected from the group consisting of oxides of iron and copper and sulfates of iron and copper.

3. The process according to claim 1, wherein the amount of the active component is from 0.5 to 20% by weight as active metal based on the weight of carrier.

4. The process according to claim 3, wherein the amount of the active component is from 1 to 10% by weight as active metal based on the weight of carrier.

5. The process according to claim 1, wherein the amount of aluminum sulfate is from 0.1 to 5% by weight as aluminum based on the weight of carrier.

6. The process according to claim 5, wherein the amount of aluminum sulfate is from 0.5 to 3% by weight as aluminum based on the weight of carrier.

7. The process according to claim 1, wherein the ratio of aluminum sulfate to the active component is from 0.05 to 0.5 in terms of metal weight ratio.

8. The process according to claim 1, wherein the gas hourly space velocity is from 1000 to 50000 $HR^{-1}$.

9. The process according to claim 1, wherein the amount of ammonia supplied as the reducing agent is such that the molar ratio of $NH_3/NO$ is from 0.8 to 1.5.

10. The process according to claim 9, wherein the molar ratio of $NH_3/NO$ is from 1.0 to 1.2.

11. A process for the removal of nitrogen oxides from a waste gas containing said nitrogen oxides together with sulfur oxides, which process is characterized by contacting said waste gas with ammonia as the reducing agent at a temperature from 250° to 550° C in the presence of a catalyst using as the carrier, silica having not less than 50m²/g of specific surface area and from 0.2 to 1.5 cc/g of pore volume, and having supported on said carrier an active component containing from 0.5 to 20% by weight, based on said carrier, of iron or copper as the active metal and aluminum sulfate containing from 0.1 to 5% by weight, based on the carrier, of aluminum.

* * * * *